United States Patent [19]

Maeder et al.

[11] Patent Number: 4,683,918
[45] Date of Patent: Aug. 4, 1987

[54] METHOD AND APPARATUS FOR PRODUCING BALING WIRE FOR TYING TOGETHER BUNDLED ITEMS

[75] Inventors: Rene Maeder, Frauenfeld; Albin Herzog, Matzingen, both of Switzerland

[73] Assignee: Gamper & Co. AG, Munchwilen, Switzerland

[21] Appl. No.: 806,968

[22] Filed: Dec. 9, 1985

[30] Foreign Application Priority Data

Dec. 24, 1984 [CH] Switzerland .......................... 6176/84

[51] Int. Cl.⁴ .............................................. B21F 45/16
[52] U.S. Cl. ...................................... 140/73; 140/140; 29/419 R
[58] Field of Search ..................... 140/2, 73, 92.2, 139, 140/140; 65/269; 219/121 LE, 121 LF; 29/419, 412; 72/342, 294

[56] References Cited

U.S. PATENT DOCUMENTS

| | | | |
|---|---|---|---|
| 1,833,010 | 11/1931 | Willy | 140/92.2 |
| 2,050,416 | 8/1936 | Blanchard | 72/342 |
| 2,068,675 | 1/1937 | Heller | 140/92.2 |
| 3,476,170 | 11/1969 | Christian et al. | 219/121 LE |
| 3,684,474 | 8/1972 | Chisholm | 65/269 |
| 3,909,583 | 9/1975 | Petro et al. | 219/121 LG |
| 4,256,948 | 3/1981 | Wolf et al. | 219/121 LE |

Primary Examiner—Lowell A. Larson
Attorney, Agent, or Firm—Haverstock, Garrett & Roberts

[57] ABSTRACT

A method for producing baling wires having enlarged tips for tying bundled items such as reinforcing rods and bags in which enlargements are formed by melting the tips of the wire segments wherein a strip of continuous wire is advanced through a first melting zone in a substantially vertical position, the wire is then heated to its melting point to sever a segment of the wire therefrom causing an enlargement to be formed at the leading tip of the subsequent wire segment, successively heating, melting and severing individual wire segments and causing the formation of the enlargements at the leading edge of the next subsequent wire segment as the strip of wire advances through the first melting zone, successively rotating each individual wire segment at least substantially 180° so as to again orient each respective wire segment in a substantially vertical position, thereafter advancing each individual wire segment through a second melting zone in its substantially vertical position and heating the opposite trailing edge of each such wire segment to its melting point to form an enlargement thereat. Due to the substantially vertical orientation of the wire segments during the heating and melting processes, it is possible to avoid detachment of the enlargement in a molten condition. Apparatus suitable for practicing the present method is also disclosed.

34 Claims, 4 Drawing Figures

METHOD AND APPARATUS FOR PRODUCING
BALING WIRE FOR TYING TOGETHER
BUNDLED ITEMS

This application corresponds to Swiss patent application No. 6176/84 filed Dec. 24, 1984 and foreign priority benefits under 35 U.S.C. §119 is hereby claimed.

The present invention refers to a method for producing baling wires or wire ties having enlarged tips which are suitable for tying together bundled items, particularly reinforcing rods and bags wherein the enlargements are produced by heating the tips of a wire segment to the melting point. The invention is further related to an apparatus for practicing the method referred to.

According to a known method of the type described above (e.g. Swiss Pat. No. 380,644) the wire is first cut to the desired length and then both ends are heat-treated, e.g. by means of a flame, light arc, or dielectrical heat, so as to create enlargements thereat. In this method the tips are heated to the melting point so that droplets are formed which constitute the enlargement of the wire tips. However, the known method cannot result in uniformly and reliably reproducible enlargements. In many instances the droplet, which is quite rapidly formed at the tips of the wire segment detaches itself therefrom. The known method is consequently not reliable in production.

It is consequently the object of the present invention to provide a method and apparatus of the type described above, in which the disadvantages of the known method can be avoided and in which baling wires having enlargements at both ends of the wire segments can be produced in a continuous process.

With respect to the method referred to above, the object is accomplished according to the invention by supplying a series of continuous wire segments and securing the same in an at least substantially vertical orientation, heating the segments to the melting point so as to sever them from the wire and thus to provide the enlargement at one of the tips of the segment and to thereafter provide the enlargement at the other tip of the wire segment by heating it to the melting point while it is in an at least substantially vertical orientation.

The term "segment of a strip of wire" in the following specification and claims shall refer to an unsevered as well as to a severed segment of the strip of the continuously supplied wire and shall be used in its short form of "wire segment".

Vertical orientation of the wire segment while its tip is being heated to the melting point serves to eliminate the effect of gravity transverse to the longitudinal axis of the wire thus removing the risk of detachment of the enlargement of the wire material in its molten condition. Rather, the enlargement during the heating stage is achieved by the advance of material from the wire segment in the direction of its longitudinal axis free from interference of significant transverse forces. The method of the invention leaves the length of the wire substantially unimpaired because the formation of the enlargement is not made on a wire having a predetermined length. Severance and enlargement at one tip are advantageously accomplished in a single operation. The formation of the enlargement at the other tip of the wire segment is accomplished due to the orientation of the same in accordance with the invention by advancing material from the wire segment itself so that the length of the wire at that location also remains substantially unimpaired. It is consequently possible to predetermine the wire length as may be desired and to produce wire segments according thereto by practicing the method according to the invention.

The enlargement may shape itself or may be shaped as an oval head, a circular head, a bullet-shaped head, a cone, a cube or a nail head. It is known that heating a wire to the melting point causes the formation of a droplet in the shape of an oval head which, in accordance with known laws of physics, extends in the direction of the wire. According to the method of the invention, this process is not impeded in any way by the orientation of the wire segments because the wire is heated to the melting point while it is in at least a substantially vertical orientation. This vertical orientation is provided at an angle of 45°–90° from the horizontal, i.e. in other words, also with a deviation of ±45° from the vertical position.

The series of wire segments passes advantageously through a clamping zone in which they are clamped, and then through a first melting zone for severing the wire segment and forming the enlarged tip, and then through a second melting zone in which the other enlarged tip is formed through heating to the melting point and thereafter through a release zone in which the completed baling wire having two enlarged ends is released. The wire segment which is at the head of the advancing wire is preferably and advantageously severed by heating to the melting point and thereby forming the enlargement at the leading tip of the subsequent wire segment. Thereafter the wire segment having the enlarged leading tip is preferably severed from the wire by heating it to the melting point in the first melting zone and thereafter the longitudinal axis of said wire segment is tilted by at least substantially 180° and the enlargement at its opposite tip is formed by heating it to the melting point. In performing this operation it is advantageous to form the enlargement preferably at the tip which is at least substantially upwardly oriented or directed so as to allow the enlargement to be extended in the direction of the wire without interference.

However, it is also possible to sever the leading wire segment by heating it to the melting point and thereby forming the enlargement at the trailing end of the severed wire segment. Such severed wire segment having an enlarged trailing tip may then have its longitudinal axis tilted by at least substantially 180° and may have the enlargement formed at its opposite tip. In this operation the enlargement is preferably formed at the opposite tip while it is depending in an at least substantially vertical direction. In this operation it is advantageous to apply additional heat to the portion of the wire segment adjacent to its depending tip so that the enlargement may extend upwardly on the wire segment against the force of gravity without interference. It is also possible to employ countervailing forces to oppose gravitational forces such as for example streams of preferably heated gas, a magnetic field, or mechanically for example by upward displacement.

The method is suitable for practice with the aid of an apparatus having a series of sequential retaining means arranged on a support at retaining stations for securing segments of the wire strip, said support being capable of conveying said segments through at least one at least substantially vertically disposed melting sector, said apparatus further including at least one melting means. In this type of apparatus the retaining sections may be mounted on a cylindrical drum which serves as a support, said drum being rotatably and drivably journaled on which the secured wire segments may be conveyed in a substantially circular path so that the heating, melting and solidification of the wire material at the tips may occur in successive zones or sectors corresponding to segments of the radius of the circular path. This allows for example a particularly compact arrangement. In this arrangement the retaining stations and associated securing means are preferably conveyable through a securing sector for securing the wire segments, a first melting sector, a second melting sector and a release sector for releasing the baling wires having enlarged tips. After formation and hardening of the enlargement at the opposite tip of the wire segments, the same may be released in the release sector and may thereafter be removed and collected. The mode of conveyance, for example in the circular path, may be continuous or discontinuous, i.e. in steps.

The retaining means may consist of customary clamping means which may be associated wih means for releasing the severed wire segments.

Embodiments of the invention are explained in detail by reference to the accompanying drawings, wherein.

Figure 1:
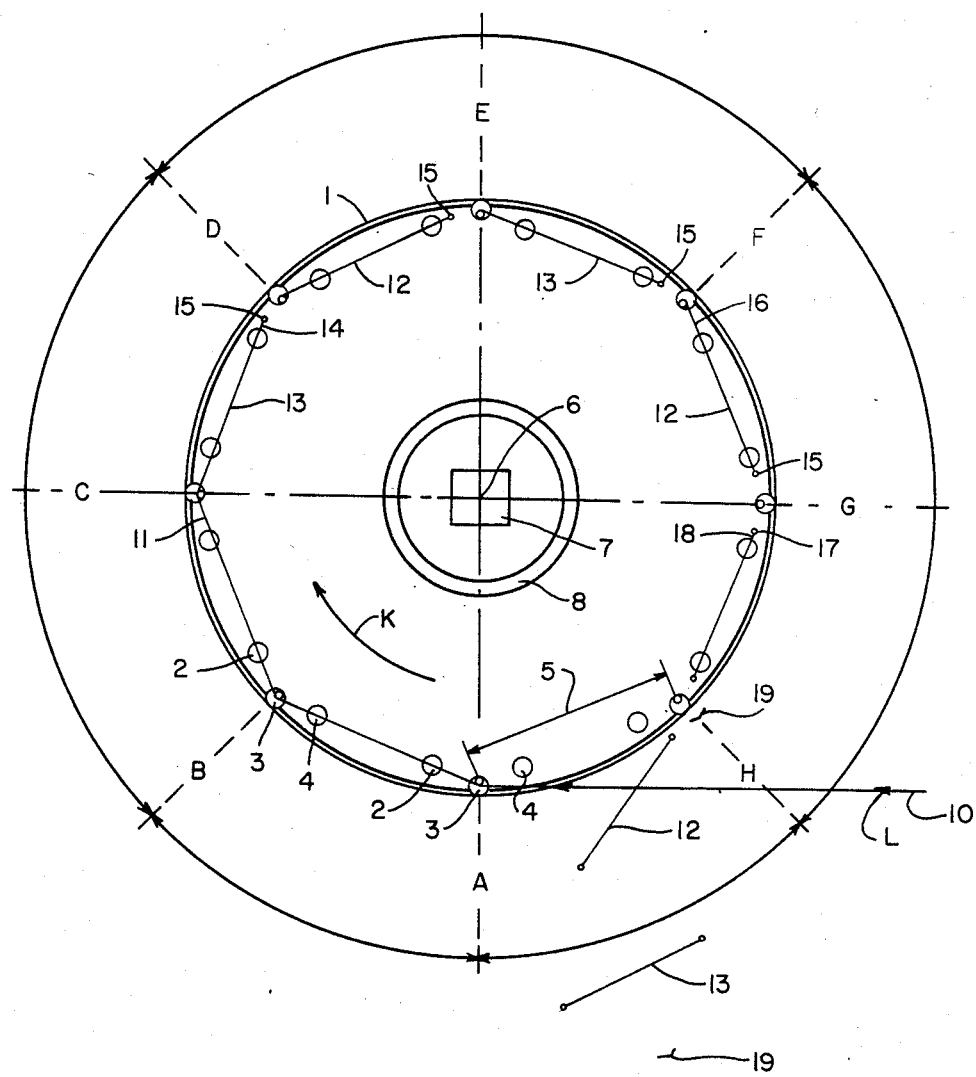
FIG. 1 is a schematic illustration of the apparatus for producing baling wires having enlarged tips constructed according to the teachings of the present invention.

As shown in FIG. 1, a support having the configuration of a drum 1 carries successively and linearly arranged clamping means 2, 3, 4 which may be for example configured as clamping jaws so that between each pair of clamping means 3 a retaining section 5 is provided. Circular drum 1 is rotatably journaled at its center 6 and may be driven in the direction of the arrow K. The clamping means 2, 3, 4, for example the clamping jaws, may be made of electrically conductive material and may be suitably insulated with respect to drum 1 or may be provided with suitable electrical conduits at their clamping surfaces. Upon rotation of drum 1 in the direction of arrow K clamping means 2, 3, 4 are conveyed successively through clamping section AB, a first heating and melting sector BCD, a tilting sector DEF, a second heating and melting section FGH and a release sector HA. During their passage through the first heating and melting sector BCD the two clamping means 3 and 4 which are arranged in pairs at the respective end portions of retaining station 5 are electrically connected for example by means of sliding contacts and by means of a switch arrangement to a source of electrical power (not illustrated) so that clamping means 3 and 4 are electrically energized. In their ensuing passage through sectors DEF, FGH, HA and AB clamping means 3, 4 are disconnected from the source of electrical power. In heating and melting sector FGH, however, an electrical voltage is applied to clamping means 2 and 3 in the same manner as previously described and in this case by suitable electrical sliding contacts. Supply of electrical voltage to the appropriate clamping means 3, 4 or 2, 3 while they are in sectors or zones BCD or FGH and for example also to the electrical drive 8 for drum 1 is controlled by regulating means 7, for example by means of the switch arrangement. To enhance the clarity of the drawings the elements just described are illustrated merely schematically since they are at the discretion of the expert.

The apparatus functions as follows:

A wire 10 is fed continuously in the direction of arrow L to drum 1 and, due to the rotation of drum 1 in the direction of arrow K is engaged sequentially by clamping means 2, 3, 4 and is there segmentally secured by means of clamping in retaining sections 5. Further operation is described by reference to two consecutive wire segments 12 and 13. Upon arrival of clamping means 3 and 4 in partial zone BC, electrical voltage is supplied to them and wire element or wire segment 11 is heated because it interconnects the two clamping means 3 and 4. Wire piece 11 is heated to the melting point in partial sector CD so that it melts and severs and thus causes the detachment of advancing wire segment 12 from wire segment 13 which remains attached to wire 10. In this process the leading tip 14 of the successive wire segment 13 is provided with an enlargement 15 by means of the material of wire piece 11. The supply of heat to wire segment 13 continues during the entire path through melting sector BCD and in partial sector CD reaches a level sufficient to cause the material of wire piece 11 to melt through. This depends, for example, upon such factors as the material, the speed of rotation of the drum and/or the extent of melting sector BCD. The melting sector BCD being positioned substantially vertically, formation of the enlargement 15 at the upwardly positioned or upwardly oriented tip 14 can be formed without detaching itself. Due to the substantially vertical position of wire segment 13, tip 14 is oriented upwardly so that gravitational forces are exerted substantially in the direction of the longitudinal axis of wire section 13. Detachment of the wire segment occurs in the manner described above when the trailing tip of wire segment 13 passes through partial sector CD.

Detached wire segment 12 which is already provided with an enlargement 15 at its leading tip passes through a tilting zone DEF in which wire segment 12 is tilted substantially 180° so that it arrives in melting sector FGH in a position in which it and its trailing tip again point substantially to the top or upwardly. In the second heating and melting zone FGH electrical current flows again through wire segment 16 between clamping means 2 and 3 as a result of electrical voltage applied to clamping means 2 and 3 whereby said wire segment is heated during its passage through melting sector FGH to such an extent that it melts. Thereupon an enlargement 17 is formed at the trailing tip 18 of wire segment 12 in the same manner as in the first melting secor BCD. In partial sector FG there is again only an application of heat and the melting of the trailing free tip 18 occurs thereafter in partial sector GH. Thereafter wire segment 12 having two enlargements 15 and 17 arrives at the release section HA where wire segment 12 is released as a wire tie.

The steps of heating, melting, tilting, heating and melting of the opposite tip of wire segments 12 and 13 as described with respect to wire segments 12 and 13 is repeated with respect to successive wire segments of wire 10 in the course of the revolution of drum 1 so that wire segments having enlargements at each tip are produced and supplied continuously.

Upon their release successive wire segments 12, 13 are preferably removed by means of a conduit (not illustrated) and collected. Concurrently with the release of wire segments 12, 13 waste segment 19 positioned at clamping element 3 is released therefrom and expelled. Thereupon clamping element 2, 3, 4 are in a position of readiness for another operation.

As already mentioned, the dimension of melting zones BCD or FGH may be critical.

Moreover, the number of such stations may be significant as explained further below.

Figure 2:
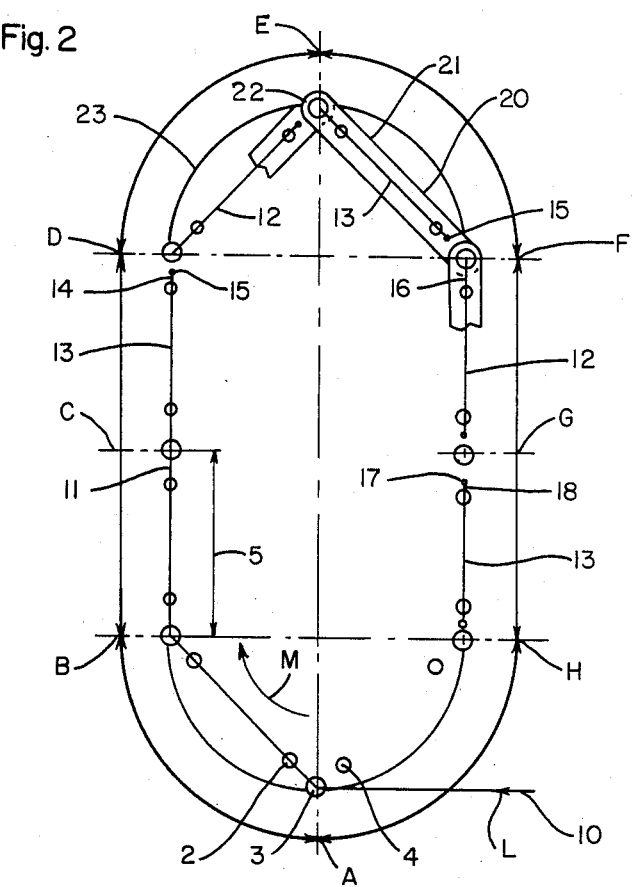
FIG. 2 is a schematic illustration of another embodiment of the present apparatus for producing baling wires having enlarge tips.

FIG. 2 in which elements identical to elements in FIG. 1 are provided with identical reference symbols shows an embodiment of the invention in which heating and melting sectors BCD and FGH have a precise vertical position so that wire segments 12 or 13 may be melted with their tips 14 and 18 in a vertical position so as to produce the enlargement in accordance with the invention. In this embodiment clamping means 2, 3, 4 are provided on a support 20 which is illustrated only fragmentally to enhance clarity and which may consist of support elements 21, for example, chain links which are flexibly connected with each other at their ends 22. Support 20 may be conveyed along a path 23 in the direction of arrow M. Inasmuch as melting zones BCD and FGH are oriented in a precisely vertical plane, passage of the wire segments may be accelerated so as to increase output while eliminating exertion of centrifugal forces in the melting zones. Heating and melting for the detachment of wire segments as well as tilting and renewed second melting occur in the same manner as in the embodiment described in connection with FIG. 1 to which reference is made for this reason.

Figure 3:
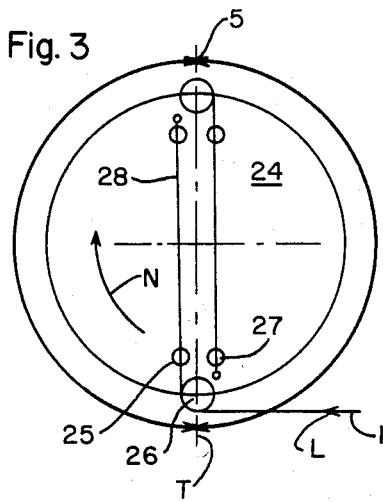
FIG. 3 is a schematic illustration of an apparatus with two stations for the production of baling wires having enlarged tips.

According to FIG. 3 clamping means 25, 26 and 27 are provided on a support 24, for example a circular disk, which is rotatably drivable in the direction of arrow N. Upon revolution of support 24 wire 10 is successively engaged by clamping means 25, 26, 27 and is placed in a vertical position as shown in FIG. 2 where wire segment 28 is positioned in a vertical melting sector ST. Further revolution of support 24 causes the longitudinal axis of wire segment 28 to be tilted by 180°. Said segment is thereby again put into a vertical orientation corresponding to melting sector TS. Upon further revolution of support 24, wire segment 28 may be released and removed. Clamping of successive wire segments is then performed in accordance with the foregoing description. Heating, melting as well as detachment of individual wire segments and the formation of the enlargement is performed between clamping elements 25, 26, 27 in the same manner as described with respect to the embodiment shown in FIG. 1.

Figure 4:
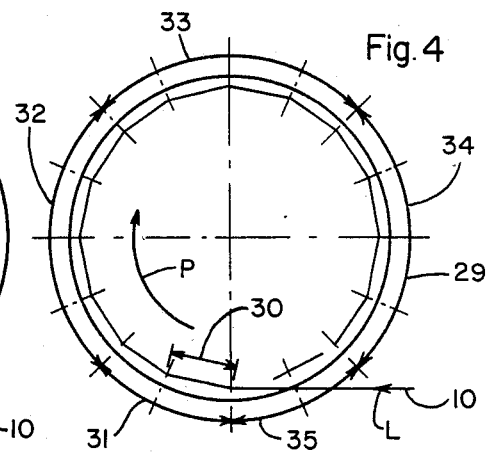
FIG. 4 is a schematic illustration of an apparatus with multiple stations for producing baling wire having enlarged tips.

FIG. 4 shows a further support 29, for example a drum, which upon its rotation in the direction of arrow P achieves successive and multiple conveyance of the wire 10 by means of a retaining station 30 through a clamping sector 31, a first heating and melting sector 32, a tilting sector 33, a second melting sector 34 and a release sector 35. In this embodiment the wire segments may be clamped and heat-treated in the same manner as described in the embodiment of FIG. 1 so as to form enlargments at both tips. The individual sectors named above have a plurality of subdivisions and a plurality of individual stations through which wire segments are conveyed. The dimension of individual sectors is enlarged due to the plurality of stations. In this manner a higher rate of production can be achieved without significantly increasing peripheral velocity. In this embodiment the plurality of stations minimizes wear at the individual stations, for example, the clamping electrodes. Furthermore, multiplication of stations enlarges the circumference of the drum so as to improve the vertical orientation of the wire segments in the melting sectors.

The velocity at which the wire segments are conveyed and the dimension of the various sectors or zones is preferably determined by reference to the wire material, for example, its melting point, its heat conductivity, its electrical resistance and the like. Melting may be accomplished by resistance heating, high frequency application, flame heating, radiant heat or ultrasound. Suitable wire materials are metals, preferably steel wire having a tensile strength of 30 to 50 kilograms per square millimeter. It is, however, also possible to utilize suitable plastic material.

Tilting of wire segments is not indispensable. It is, for example, possible to melt and detach depending wire segments from the wire. Thereupon the wire segment may be conveyed in the same orientation, for example vertical, to another location on the apparatus where it may be provided with an enlargement at its opposite tip, as described above. It is also, for example, possible to perform at the same location of the apparatus sequentially first the melting detachment and formation of the enlargement at one tip and thereafter the enlargement at the opposite tip of each wire segment and to release the wire segment thereafter.

What is claimed is:

1. A method for producing baling wires having enlarged tips for tying bundled items and the like comprising the following steps:
   (1) supplying a strip of continuous substantially linear wire,
   (2) conveying said strip of continuous wire into an at least substantially vertical orientation,
   (3) clamping at least a portion of said strip of continuous wire in a clamping zone as said wire strip is conveyed into its at least substantially vertical orientation,
   (4) conveying said wire while in its at least substantially vertical orientation through a first melting zone and heating at least a portion thereof at an intermediate location therealong to its melting point to sever a linear segment of said wire from said strip of continous wire,
   (5) said heating forming an enlargement at one tip end of said linear wire segment, and
   (6) thereafter conveying said linear wire segment through a second melting zone and heating the opposite tip end of said linear wire segment while in an at least substantially vertical orientation to its melting point to form an enlargement at said opposite tip end,
   (7) said enlargement being formed at each respective tip end of said linear wire segment as said tip ends point at least substantially vertically.

2. The method according to claim 1 wherein said wire segment is conveyed through a release zone for releasing a wire segment having enlargements at both opposite tips thereof.

3. The method according to claim 1 including repeating steps 2 through 7 to form a plurality of wire segments having enlargements at both opposite ends thereof.

4. The method according to claim 3 wherein the leading wire segment is severed by melting so as to form the enlargement at the leading tip of the successive wire segment.

5. The method according to claim 4 wherein said successive wire segment having an enlarged leading tip is detached from said strip of continuous wire by melting and its longitudinal axis is thereafter tilted by at least substantially 180° prior to the formation of the enlargement at its opposite tip.

6. The method according to claim 4 wherein the lead wire segment is detached by melting and an enlargement is formed at the trailing tip thereof.

7. The method according to claim 6 wherein the lead wire segment having an enlarged trailing tip has its longitudinal axis tilted by substantially 180° prior to the formation of the enlargement at its opposite tip.

8. The method according to claim 1 wherein the enlargement is formed at each respective tip of the wire segment as said tip points at least substantially upwardly.

9. The method according to claim 1 wherein the enlargement is formed at each respective tip of said wire segment in an at least substantially vertically depending orientation.

10. The method according to claim 9 wherein said wire segment is supplied with additional heat in the portion adjacent to its at least substantially depending tip.

11. The method according to claim 9 including providing magnetic means to said depending tip to counteract gravitational forces.

12. The method according to claim 9 including providing a mechanical force to said depending tip to counteract gravitational forces.

13. The method according to claim 9 including providing a stream of gas to said depending tip to counteract gravitational forces.

14. The method according to claim 1 wherein said clamped wire segment is conveyed in a substantially circular path in which the tips of the wire material are heated, melted and solidified in successive radial segments of said path.

15. The method according to claim 1 wherein said heating for the detachment and formation of the enlargement at the tips of said wire segment is performed by resistance heating.

16. The method according to claim 1 wherein said heating for the detachment and formation of the enlargement at the tips of said wire segment is performed by high frequency heating.

17. The method according to claim 1 wherein said heating for the detachment and formation of the enlargement at the tips of said wire segment is performed by flame heating.

18. The method according to claim 1 wherein said heating for the detachment and formation of the enlargement at the tips of said wire segment is performed by radiant heating.

19. The method according to claim 1 wherein said heating for the detachment and formation of the enlargement at the tips of said wire segment is performed by ultrasound.

20. The method according to claim 1 wherein said at least substantially vertical orientation corresponds to an angle in the range of about 45° to 90°.

21. A method for producing baling wires having enlarged tips for tying bundled items and the like comprising the following steps:

(1) supplying a strip of continuous substantially straight wire,
(2) successively clamping at least a portion of said strip of continuous wire while conveying said wire strip into a first at least substantially vertical position in a first melting zone,
(3) heating said portion of said wire to its melting point in said first melting zone at an intermediate location therealong to sever a linear segment of said wire from said strip of continuous wire,
(4) said heating in said first melting zone forming an enlargement at the upper tip end of the successive wire segment,
(5) heating at least a portion of said successive wire segment to its melting point in said first melting zone at an intermediate location therealong to sever said successive wire segment from the remainder of said strip of continuous wire,
(6) tilting the longitudinal axis of said successive wire segment at least substantially 180° to a second at least substantially vertical position,
(7) conveying said successive wire segment while in its second at least substantially vertical position through a second melting zone,
(8) heating said successive wire segment at its opposite now upper tip end to its melting point in said second melting zone to form an enlargement thereat,
(9) said enlargement being formed at each tip end of said successive wire segment as said tip ends point respectively at least substantially vertically upwardly in said respective melting zones,
(10) releasing said successive linear wire segment having enlargements at both opposite tips thereof, and
(11) repeating steps 2 through 10 so as to provide a plurality of linear wire segments having enlargements formed at both opposite tips thereof.

22. Apparatus for producing baling wire having enlarged tips for tying bundled itesm and the like wherein the enlargements are formed by melting the respective tips of the wire segments when said wire tips are each respectively orientated so as to point substantially vertically, said apparatus comprising a support member having successive means associated therewith for securing a strip of continuous substantially straight wire thereto, said support member being capable of conveying said strip of wire through a first at least substantially vertically disposed melting sector said strip of wire being conveyed through said first melting sector while in an at least substantially vertical orientation, said first melting sector including means for heating at least a portion of said strip of wire therewithin at an intermediate location to sever a linear segment of said wire from said strip of continuous wire, said support member being capable of conveying said linear wire segment through a second at least substantially vertically disposed melting sector, said linear wire segment being conveyed through said second melting sector while in an at least substantially vertical orientation, said second melting sector including means for heating at least a portion of said linear wire segment therewithin to its melting point, said heating means being located in each of said first and second melting sectors so as to apply heat to one of the respective tip end of said linear wire segment as said wire segment is conveyed respectively therethrough, said heating means forming an enlargement at one tip end of said linear wire segment as said wire segment is conveyed through said first melting sector and forming an enlargement at the opposite tip end of said linear wire segment as said wire segment is conveyed through said second melting sector, said heat being applied to the respective tip ends of said linear wire segment as said tip ends point respectively at least substantially vertically in said first and second melting sectors.

23. The apparatus according to claim 22 wherein said support member includes a cylindrical drum upon which said successive securing means are linearly arranged and rotatably drivably mounted.

24. The apparatus according to claim 22 wherein said securing means includes clamping means.

25. The apparatus according to claim 22 wherein said first and second melting sectors are disposed at an angle of about 45° to about 90° to the horizontal.

26. The apparatus according to claim 22 wherein said successive means for securing segments of a strip of substantially straight wire to said support member are conveyable through a securing sector for accomplishing the securing of said wire segments to said support member, said means being also conveyable through a first melting sector, a second melting sector and a release sector, said release sector including means for releasing said wire segments from said support member, said heating means forming an enlargement at the upper tip end of each wire segment as said wire segments are conveyed through said first melting sector, said support member including means for inverting the longitudinal axis of each wire segment at least substantially 180° to a second at least substantially vertical position while conveying said wire segments into said second melting sector, said heating means forming an enlargement at the opposite now upper tip end of each wire segment as said wire segments are conveyed through said second melting sector.

27. The apparatus according to claim 26 wherein said securing means is capable of being connected to an electrical power source at each respective end of said securing sector.

28. The apparatus according to claim 26 wherein said securing means are associated with said releasing means for effecting release of said wire segments from said support member.

29. Apparatus for producing baling wire having enlarged tips for tying bundled items and the like wherein the enlargements are formed by melting the respective tips of the wire segments when said wire tips are each respectively orientated so as to point substantially vertically, said apparatus comprising a support member having successive means associated therewith for securing segments of a strip of substantially straight wire thereto, said support member being capable of conveying segments of said wire through at least one substantially vertically disposed melting sector, said wire segments being conveyed through said melting sector while in an at least substantially vertical orientation, each of said melting sectors including means for heating at least a portion of the wire segment therewithin to its melting point, said heating means being located so as to apply heat to the respective tip end of each wire segment to form an enlargement thereat as said tip end points respectively at least substantially vertically in said respective melting sector, said support member including a cylindrical drum upon which said successive securing means are linearly arranged and rotatably drivably mounted.

30. The apparatus according to claim 29 wherein said successive means for securing segments of a strip of substantially straight wire to said support member are conveyable through a securing sector for accomplishing the securing of said wire segments to said support member, said means being also conveyable through a first melting sector, a second melting sector and a release sector, said release sector including means for releasing said wire segments from said support member, said heating means forming an enlargement at the upper tip end of each wire segment as said wire segments are conveyed through said first melting sector, said support member inverting the longitudinal axis of each wire segment at least substantially 180° to a second at least substantially vertical position while conveying said wire segments into said second melting sector, said heating means forming an enlargement at the opposite now upper tip end of each wire segment as said wire segments are conveyed through said second melting sector.

31. The apparatus according to claim 30 wherein said securing means is capable of being connected to an electrical power source at each respective end of said securing sector.

32. The apparatus according to claim 30 wherein said securing means are associated with said releasing means for effecting release of said wire segments from said support member.

33. The apparatus according to claim 29 wherein said securing means includes clamping means.

34. The apparatus according to claim 29 wherein said melting sectors are disposed at an angle of about 45° to about 90° to the horizontal."

* * * * *

UNITED STATES PATENT OFFICE
CERTIFICATE OF CORRECTION

Patent No. 4,683,918　　　　　　　　　Dated August 4, 1987

Inventor(s) Rene Maeder and Albin Herzog

It is certified that error appears in the above-identified patent and that said Letters Patent are hereby corrected as shown below:

Column 8, line 40 "itesm" should be --items--.

Signed and Sealed this

Twenty-fourth Day of November, 1987

*Attest:*

*Attesting Officer*

DONALD J. QUIGG

*Commissioner of Patents and Trademarks*